(12) United States Patent
Yao

(10) Patent No.: US 7,233,720 B2
(45) Date of Patent: Jun. 19, 2007

(54) DEVICES BASED ON OPTICAL WAVEGUIDES WITH ADJUSTABLE BRAGG GRATINGS

(75) Inventor: Xiaotian Steve Yao, Diamond Bar, CA (US)

(73) Assignee: General Photonics Corporation, Chino, CA (US)

( * ) Notice: Subject to any disclaimer, the term of this patent is extended or adjusted under 35 U.S.C. 154(b) by 0 days.

(21) Appl. No.: 10/946,665

(22) Filed: Sep. 21, 2004

(65) Prior Publication Data

US 2005/0041922 A1    Feb. 24, 2005

Related U.S. Application Data

(62) Division of application No. 10/649,179, filed on Aug. 26, 2003, now Pat. No. 6,795,616, which is a division of application No. 09/226,030, filed on Jan. 6, 1999, now Pat. No. 6,628,861.

(51) Int. Cl.
  *G02B 6/26* (2006.01)
  *G02B 6/34* (2006.01)
  *H04J 14/00* (2006.01)
  *H04J 14/08* (2006.01)

(52) U.S. Cl. ................ 385/28; 385/37; 385/50; 385/32; 398/53; 398/102

(58) Field of Classification Search ........... 385/37, 385/28, 29, 50; 398/53, 102
See application file for complete search history.

(56) References Cited

U.S. PATENT DOCUMENTS

| 4,327,966 A | 5/1982 | Bloom |
| 4,622,663 A | 11/1986 | Ishikawa et al. |
| 4,674,830 A * | 6/1987 | Shaw et al. ............... 398/92 |
| 4,684,215 A * | 8/1987 | Shaw et al. ............... 385/4 |
| 4,761,833 A * | 8/1988 | Epworth ............... 398/58 |
| 4,793,676 A * | 12/1988 | Risk ............... 385/1 |
| 4,815,804 A * | 3/1989 | Desurvire et al. ........... 385/27 |
| 4,914,665 A * | 4/1990 | Sorin ............... 372/20 |
| 4,955,028 A | 9/1990 | Alferness et al. |
| 5,058,977 A | 10/1991 | Sorin |
| 5,546,484 A * | 8/1996 | Fling et al. ............... 385/16 |
| 5,561,726 A | 10/1996 | Yao |
| 5,706,375 A | 1/1998 | Mihailov et al. |
| 5,724,164 A | 3/1998 | Lowenhar et al. |
| 5,774,619 A * | 6/1998 | Bruesselbach ........... 385/137 |
| 5,890,816 A * | 4/1999 | Delavaux ............... 385/11 |
| 6,031,950 A | 2/2000 | Fujita |
| 6,282,341 B1 * | 8/2001 | Digonnet et al. ........... 385/37 |

OTHER PUBLICATIONS

Youngquist, R.C., Brooks, J.L., Shaw, H.J., "Birefingent-fiber polarization coupler", Optics Letters, Vo. 8, No. 12, 656-658 (1983).*

(Continued)

*Primary Examiner*—Brian Healy
*Assistant Examiner*—Charlie Peng
(74) *Attorney, Agent, or Firm*—Fish & Richardson P.C.

(57) ABSTRACT

A system for filtering light propagating in a waveguide is described. The system utilizes an adjustable periodic grating which induces mode coupling of predetermined frequencies of light propagating in the waveguide.

5 Claims, 11 Drawing Sheets

OTHER PUBLICATIONS

T. Grdogan and Mizrahi, "Fiber Phase Gratings Reflect Advances in Lightwave Technology," Laser Focus World, Feb. 1994.

Francois Ouellette, "All-Fiber Filter for Efficient Dispersion Compensation," Optics Letters, vol. 16, No. 5, pp. 303-305, 1991.

M.G. Xu, et al. "Tunable Fiber Bandpass Filter Based on a Linearly Chirped Fiber Bragg Grating for Wavelength Multiplexing", Electronics Letters, vol. 32, No. 20, pp. 1918-1921, 1996.

M. M. Ohn, et al. "Dispersion Variable Fiber Bragg Grating Using a Piezoelectric Stack," Electronics Letters, vol. 32, No. 21, pp. 2000-2001, 1998.

F. Bilodeau, et al, "Photo Sensitization of Optical Fiber and Silica-on-Solicaon/Silica Waveguides," Optics Letters, vol. 18 No. 12, pp. 953-955, 1993.

* cited by examiner

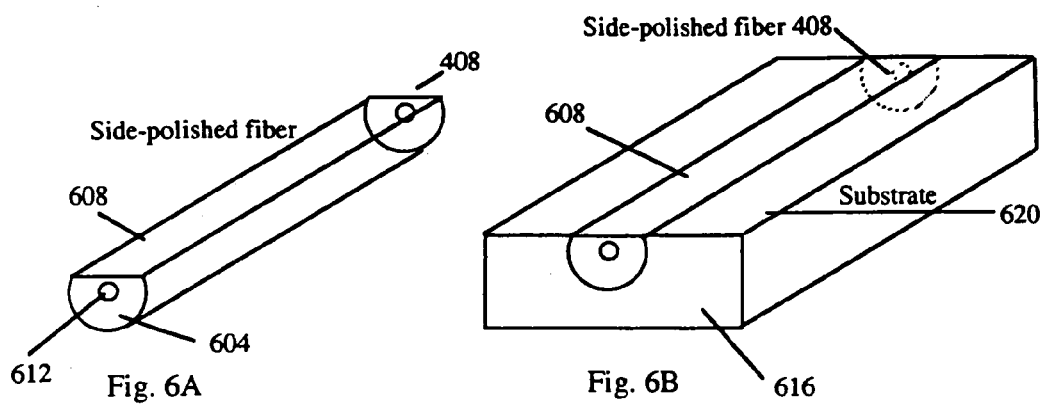
Fig. 6A
Fig. 6B
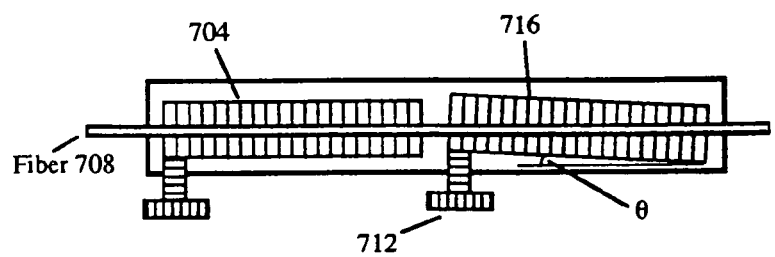
Fig. 7A

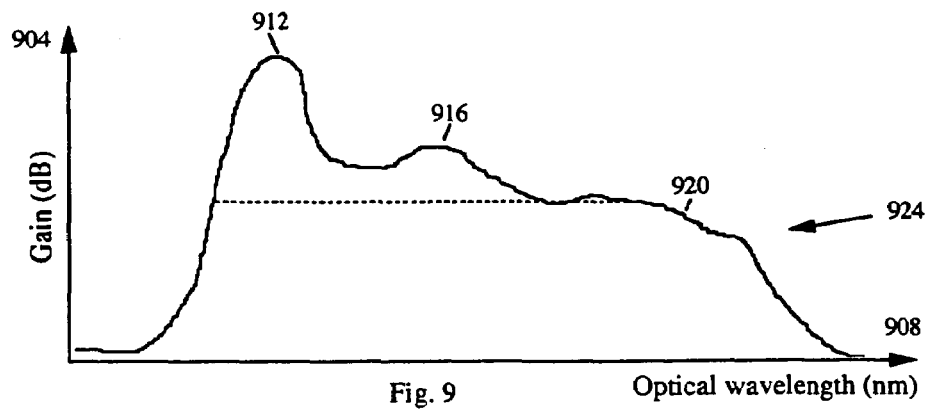
Fig. 9
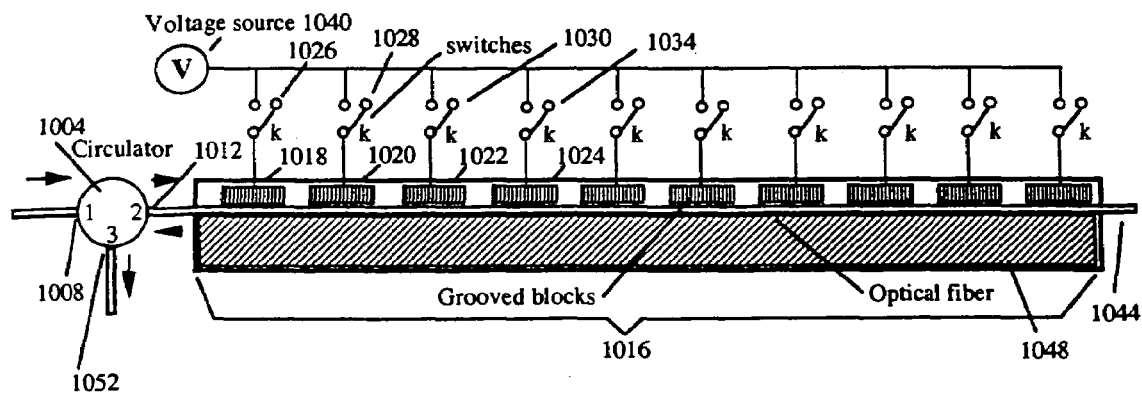
Fig. 10
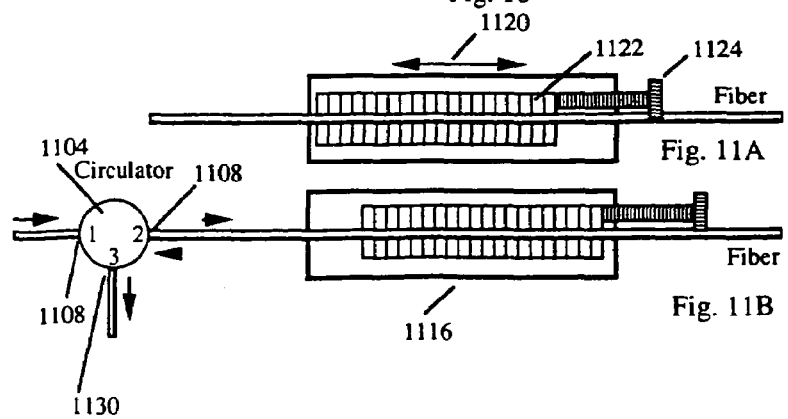
Fig. 11A
Fig. 11B

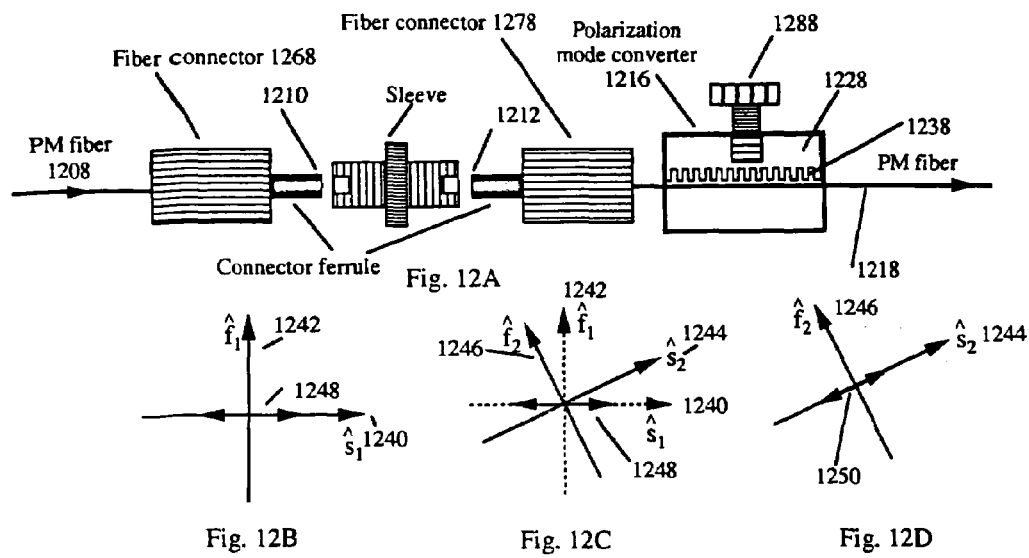
Fig. 12A
Fig. 12B
Fig. 12C
Fig. 12D
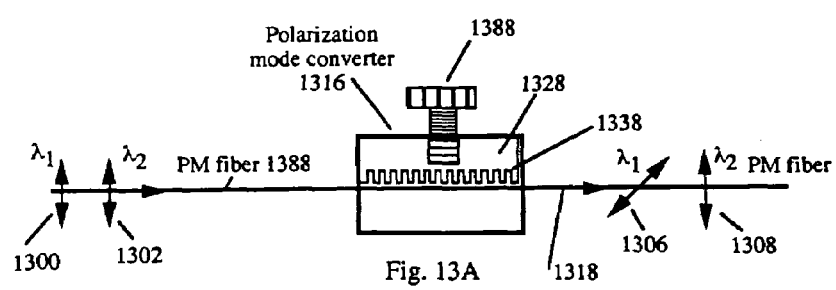
Fig. 13A
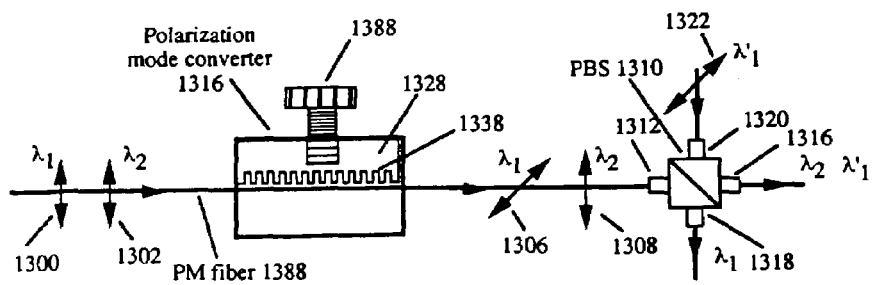
Fig. 13B

DEVICES BASED ON OPTICAL WAVEGUIDES WITH ADJUSTABLE BRAGG GRATINGS

This application is a divisional application and claims the benefit of priority under 35 USC 120 of U.S. application Ser. No. 10/649,179, filed Aug. 26, 2003 and issued as U.S. Pat. No. 6,795,616 on Sep. 21, 2004. The U.S. application Ser. No. 10/649,179 is a divisional (and claims the benefit of priority under 35 USC 120) of U.S. application Ser. No. 09/226,030, filed Jan. 6, 1999 and issued as U.S. Pat. No. 6,628,861 on Sep. 30, 2003. The disclosures of the prior applications are considered part of (and are incorporated by reference in) the disclosure of this application.

BACKGROUND OF THE INVENTION

1. Field of the Invention

The present invention relates generally to controlling light propagating in a wave guide. More particularly, the present invention relates to using gratings to cause mode coupling of light propagating in a wave guide.

2. Description of Related Art

Devices used in optical systems, such as in fiber optic communication systems and sensing systems, often benefit from the filtering or control of light propagating in a wave guide. Examples of such devices include, but are not limited to, source lasers, optical amplifiers, filters and other integrated-optical components. One method of controlling and filtering light utilizes diffraction gratings. Descriptions of such devices and how they benefit from diffraction gratings are described in T. Erdogan and V. Mizrahi, "Fiber Phase Gratings Reflect Advances in Lightwave Technology," February 1994 edition of Laser Focus World.

There are three techniques typically used to create a diffraction grating in a wave guide to induce mode coupling or Bragg reflection. The most common method uses ultraviolet light to induce a refractive index change in an optical fiber. A system for producing a periodic refractive index change in the optical fiber is illustrated in FIG. 1. In FIG. 1 a first beam 104 of coherent ultraviolet "UV" light and a second beam 108 of coherent UV light are directed at a photosensitive optical fiber 112. At the intersection of the first beam 104 and the second beam 108, an interference pattern 116 is generated. The refractive index of the photosensitive optical fiber 112 changes with the intensity of the UV exposure, thus an index grating with a periodicity determined by the interference pattern 116 forms where the first coherent beam 104 and the second coherent beam 108 intersect.

A second technique for creating a grating in an optical fiber involves etching a periodic pattern directly onto an optical fiber. In one embodiment, a photomask is used to generate a periodic pattern in a photolithographic process. An acid etch etches the grating or periodic pattern into the optical fiber. Such photomasks and etching are commonly used in semiconductor processes.

A third technique to control light in a waveguide is used in semiconductor waveguides. In one embodiment, a layered growth is formed on the semiconductor wave guide to generate light reflection in the wave guide.

The described techniques for creating a grating on or in a wave guide are permanent. The gratings have a fixed periodicity at a fixed location on the waveguide that cannot be easily changed. Thus, a particular wave guide and grating combination will have a predetermined transmission characteristic. In order to change the characteristic, the entire wave guide segment containing the grating is typically replaced with a wave guide segment having a different transmission characteristic. Replacing wave guide segments is a cumbersome process requiring that each end be properly coupled to the light source and the light receiving device.

Thus, an improved system and method to control light propagating in a wave guide is needed.

SUMMARY OF THE INVENTION

The present invention relates to a method and apparatus of controlling light transmitted in a wave guide. The apparatus uses a holder to fix a wave guide in a fixed position relative to an adjustable periodic grating. The periodic grating is movable to at least two positions, in one position the periodic grating induces mode coupling in the wave guide, and in the second position the periodic grating does not induce mode coupling in the wave guide.

The present application also describes other devices. Examples of various devices include:

1. A tunable apparatus for controlling light transmitted in a wave guide comprising:

a waveguide holder; and an adjustable periodic grating coupled to the waveguide holder, the adjustable periodic grating moveable between a first position and a second position.

2. The tunable apparatus of claim 1 wherein when the periodic grating is in the first position, the adjustable periodic grating produces mode coupling from a first mode to a second mode of at least one wavelength of light propagating in the waveguide.

3. The tunable apparatus of claim 2 wherein moving the adjustable periodic grating to a second position prevents mode coupling at the at least one wavelength of light.

4. The tunable apparatus of claim 2 wherein in the first position, an air gap separates the adjustable periodic grating and the optic cable.

5. The tunable apparatus of claim 2 wherein in the first position, the adjustable periodic grating contacts the optic cable.

6. The tunable apparatus of claim 1 further comprising:

an index matching fluid between the waveguide and the grating.

7. The tunable apparatus of claim 1 wherein the distance separating grooves on the adjustable periodic grating is between 0.1 um and 10 mm.

8. The tunable apparatus of claim 2 wherein one wavelength of light propagating in a forward direction that is coupled into a backward direction is given by:

$$\lambda = \Lambda/2n_{\mathit{eff}}$$

wherein: $\Lambda$=periodicity of the grating, and $n_{\mathit{eff}}$=the effective refractive index of the waveguide.

9. The tunable apparatus of claim 2 wherein one wavelength of light propagating in a core of the waveguide that mode couples into a cladding of the waveguide is determined by:

$$\lambda = \Lambda(n_{core} - n_{cladding})$$

wherein: $\Lambda$=periodicity of the grating $n_{core}$=the refractive index of a core of the waveguide, and $n_{cladding}$=index of refraction of the cladding of the waveguide.

10. The tunable apparatus of claim 2 wherein one wavelength of light coupled from a first polarization mode to a second polarization mode is given by:

$$\lambda = \Lambda(n_s - n_f)$$

wherein: $\Lambda$=periodicity of the grating
$n_s$=effective refractive index of the first polarization mode
$n_f$=effective index of refraction of the second polarization mode.

11. The tunable apparatus of claim 2 wherein one wavelength of light coupled from a first transversal mode to a second transversal mode is given by:

$$\lambda = \Lambda(n_1 - n_2)$$

wherein: $\Lambda$=periodicity of the grating
$n_1$=effective refractive index of the first transversal mode
$n_f$=effective index of refraction of the second transversal mode.

11(A). The tunable apparatus of claim 1 further comprising a second periodic grating coupled to the waveguide holder.

12. The tunable apparatus of claim 2 wherein the first periodic grating produce mode coupling of a first frequency, the tunable apparatus further comprising:
a second periodic grating coupled to the waveguide holder, the second periodic grating producing mode coupling at a second frequency, the adjustable periodic grating working in cooperation with the second periodic grating to produce mode coupling at a third frequency, the third frequency higher than either the first frequency and the second frequency.

13. The tunable apparatus of claim 1 further comprising:
a screw coupled to the periodic grating to move the periodic grating between the first position and the second position.

14. The tunable apparatus of claim 1 further comprising:
a spring coupled to the periodic grating to regulate a pressure on the periodic grating and a waveguide in the waveguide holder.

15. The tunable apparatus of claim 1 further comprising:
a piezo-electric coupled to the periodic grating to move the periodic grating between the first position and the second position.

16. The tunable apparatus of claim 1 wherein the waveguide includes a cladding and a cladding reduced region, the periodic grating in contact with the waveguide in the cladding reduced region.

17. The tunable apparatus of claim 1 wherein the waveguide includes a cladding and a cladding reduced region, the periodic grating oriented such that in the first position, the periodic grating intersects an evanescent field of a waveguide mode in the cladding reduced region.

18. The tunable apparatus of claim 1 where the periodic grating is a chirped grating.

19. The tunable apparatus of claim 18 wherein a spacing of grooves in the chirped grating varies quadratically.

20. The tunable apparatus of claim 18 wherein a spacing of grooves in the chirped grating varies linearly.

21. The tunable apparatus of claim 1 wherein the periodic grating is rotatable to an angle such that an effective grating spacing to light propagating in the waveguide is a physical spacing of the periodic grating divided by a cosine of the angle.

22. A method of filtering at least one frequency of light propagating in a waveguide comprising the acts of:
positioning a periodic grating to induce mode coupling of one frequency of light in the waveguide;
determining the intensity of the one frequency of light propagating in the waveguide; and
repositioning the periodic grating to change the intensity of the mode coupling of the one frequency of light.

23. The tunable apparatus of claim 22 wherein the waveguide is an optical filter.

24. The method of claim 22 wherein the act of repositioning further comprises:
rotating a screw coupled to the periodic grating to reposition the periodic grating.

25. The method of claim 22 wherein the act of repositioning further comprises:
changing an electric potential applied to a piezo-electric to move the periodic grating.

26. The method of claim 22 further comprising the act of:
side polishing the optical fiber before positioning the periodic grating.

27. An optic equalizer comprising:
a waveguide to guide light;
a first adjustable periodic grating positioned at a first region of the waveguide, the first adjustable periodic grating to generate mode coupling at a first frequency;
a second adjustable periodic grating positioned at a second region of the optical fiber, the second adjustable periodic grating to generate mode coupling at a second frequency.

28. The optic equalizer of claim 27 wherein the first adjustable periodic grating is coupled to a screw to move the first adjustable periodic grating between a first position and a second position.

29. The optic equalizer of claim 27 wherein the first adjustable periodic grating is coupled to a piezo-electric to move the first adjustable periodic grating between a first position and a second position.

30. The optic equalizer of claim 27 further comprising:
a third adjustable periodic grating positioned at a third region of the optical fiber, the third adjustable periodic grating to generate mode coupling at a third frequency, the combination of the first adjustable grating, the second adjustable grating and the third adjustable grating to adjust the spectral content of light propagating in the waveguide at a fourth position in the waveguide.

31. A graphic equalizer comprising:
a waveguide;
a plurality of adjustable periodic gratings, each adjustable periodic grating in the plurality of adjustable periodic gratings independently adjustable to alter the intensity of a corresponding frequency range of light propagating in the waveguide.

32. A method of using a graphic equalizer comprising:
receiving light in a waveguide;
determining the desired spectral content of light at a position on the waveguide;
adjusting at least one periodic grating to cause mode coupling of an undesired frequency of light propagating in the waveguide.

33. A variable delay apparatus comprising:
a circulator to receive a light beam at an input port;
a variable delay line coupled to a processing port of the circulator, the circulator to propagate the light beam from the input port to the variable delay line;
a plurality of adjustable gratings, each adjustable grating movable between a corresponding first position which produces Bragg reflection in the variable delay line and a second position which does not produce Bragg reflection in the variable delay line, the circulator receiving Bragg reflected signals at the processing port and outputting the Bragg reflected signals at an output port of the circulator.

34. The apparatus of claim 33 further comprising:
a plurality of piezo-electrics, each piezo-electric in the plurality of piezo-electrics coupled to a corresponding adjustable grating to move the corresponding adjustable grating between the first position and the second position.

35. The apparatus of claim 34 further comprising:
a voltage source;
a plurality of switches, each switch in the plurality of switches to couple the voltage source to a corresponding piezo-electric in the plurality of piezo-electrics such that switching a switch induces a corresponding piezo-electric to move a corresponding adjustable grating.

36. A variable delay apparatus comprising:
a waveguide segment; and
an adjustable periodic grating moveable along the waveguide segment in the direction of light propagation in the waveguide, the adjustable periodic grating inducing Bragg reflection in the waveguide.

37. The variable delay apparatus of claim 36 further comprising:
a circulator to transmit light to the waveguide segment and to receive light reflected within the waveguide segment.

38. The variable delay apparatus of claim 36 wherein the adjustable periodic grating is moved by a screw.

39. A method of transfering a light signal from a first polarization maintaining fiber to a second polarization maintaining fiber comprising
coupling the first polarization maintaining fiber to the second polarization maintaining fiber at a joint to form a combination polarization maintaining fiber;
position a periodic grating to induce mode coupling of one frequency of light in the combination polarization maintaining fiber;
adjusting pressure between the periodic grating and the combination polarization maintaining fiber to couple power between a fast mode and a slow mode of the combination polarization maintaining fiber.

40. A tunable polarizer comprising:
a polarization maintaining fiber including a core and a cladding; and
a periodic grating coupled to the polarization maintaining fiber to couple a first polarization mode of a first wavelength into the cladding.

41. The tunable apparatus of claim 40 wherein the periodic grating presses against the polarization maintaining fiber to induce a periodic change in a refractive index of the polarization maintaining fiber to couple the first polarization mode of the first wavelength into the cladding.

42. A variable optical attenuator comprising
a first polarization maintaining fiber;
a periodic grating to re-orient a polarization of a signal propagating in the first polarization maintaining fiber, and
a polarizer to attenuate a portion of the signal output by the periodic grating.

43. The variable optical attenuator of claim 42 wherein the polarizer further comprising:
a second polarization maintaining fiber including a cladding and a core to receive the output of the first polarization maintaining fiber; and
a second periodic grating to couple a first polarization mode of a selected wavelength propagating in the core into the cladding of the second polarization maintaining fiber.

44. An add/drop filter comprising:
a periodic grating to reorient a polarization of a first wavelength of light propagating in a polarization maintaining fiber; and
a polarization beamsplitter having a first input port coupled to the polarization maintaining fiber to direct the first wavelength of light output from the polarization maintaining fiber in a first direction and a second wavelength of light output from the polarization maintaining fiber in a second direction.

45. The add/drop filter of claim 44 wherein the polarization beamsplitter further comprises a second input port to couple a third wavelength of light into the second direction.

46. An optical filer comprising:
a bimodal fiber;
a periodic grating to switch a portion of a signal propagating in the bimodal fiber from a first mode to a second mode; and
a bimodal coupler to separate the portion of the signal propagating in the second mode from the portion of the signal remaining in the first mode.

47. An add/drop filter comprising:
a multimode fiber supporting at least two transversal modes;
a transversal mode converter to convert predetermined wavelengths of a first set of signals in the multimode fiber from a first mode to a second mode; and
a bimodal coupler having a first input port coupled to the multimode fiber to direct the predetermined wavelengths of the first set of signals in a first direction and to direct other wavelengths of the first set of signals in a second direction.

48. The add/drop filter of claim 47 wherein the transversal mode converter further comprises:
a periodic grating coupled to a waveguide carrying the set of signals to induce a periodic change in an index of refraction of the waveguide to convert the predetermined wavelengths of the set of signals from the first mode to the second mode.

49. The add/drop filter of claim 47 wherein the bimodal coupler further comprising a second input port to couple a second set of signals into the second direction.

50. An optical buffer comprising:
a waveguide loop;
a bimodal coupler to output signals propagating in a first mode from the waveguide loop, the bimodal coupler maintaining signals in a second mode in the waveguide loop; and
a switchable mode converter including a grating to switch the signal from the second mode to the first mode.

51. A tunable apparatus for controlling light transmitted in a waveguide comprising:
a waveguide holder;
a periodic grating; and
a coupling device to couple the waveguide holder to the periodic grating, the periodic grating adjustable to change a spacing between the waveguide holder and the periodic grating.

52. The tunable apparatus of claim 51 further comprising:
a waveguide in the waveguide holder wherein the coupling device adjusts the periodic grating to induce a periodic change in an index of refraction of the waveguide.

53. A tunable apparatus for controlling light transmitted in a waveguide comprising:
means for adjusting a pressure of a periodic grating against a waveguide.

54. The tunable apparatus of claim 53 wherein the adjusting of the pressure induces a periodic change in an index of refraction of the waveguide.

55. The tunable apparatus of claim 53 wherein the means for adjusting pressure includes a piezoelectric to move the periodic grating.

56. The tunable apparatus of claim 53 wherein the means for adjusting pressure includes a screw to move the periodic grating.

57. A tunable apparatus for controlling light transmitted in a waveguide comprising:

means for adjusting a spacing between a periodic grating and a center point in a waveguide, the adjusting of the spacing to induce mode coupling of a signal propagating in the waveguide.

BRIEF DESCRIPTION OF THE DRAWINGS

The advantages of the present invention will become more readily apparent to those ordinarily skilled in the art after reviewing the following detailed description and accompanying drawings wherein:

FIGS. 6A and 6B illustrate an optical fiber for use as a waveguide in one embodiment of the present invention.

FIG. 7A illustrates an apparatus to rotate a periodic grating with respect to the direction of light propagation in one embodiment of the invention.

FIG. 9 is a graph illustrating an example of the output of an optic equalizer.

FIG. 10 illustrates using a plurality of adjustable periodic gratings to create a variable delay line.

FIGS. 11A and 11B illustrate a variable delay line crated using one adjustable periodic grating.

FIGS. 12A, 12B, 12C, and FIG. 12D illustrate using a grating induced polarization mode converter to connect two polarization maintaining fibers.

FIG. 13A illustrates wavelength selective polarization mode conversion.

FIG. 13B illustrates one embodiment of an add/drop filter including a wavelength selective polarization mode converter and a polarization beamsplitter.

DETAILED DESCRIPTION OF THE INVENTION

Figure 1:
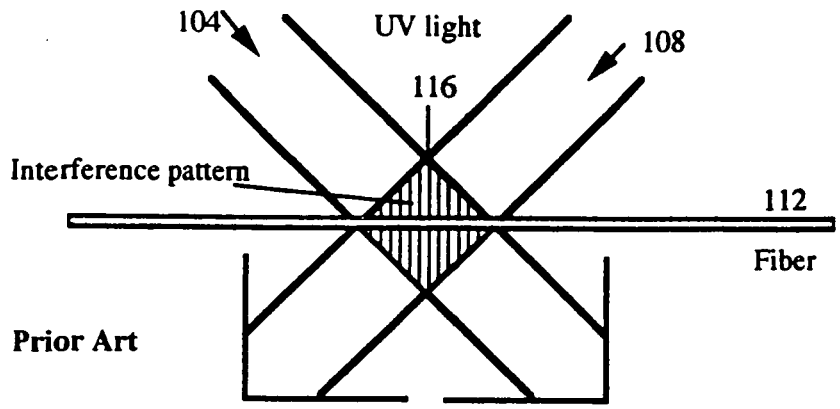
FIG. 1 illustrates a prior art system for creating a periodic grating in a wave guide.

The following invention describes a method and apparatus of using an external grating to cause mode coupling in a wave guide. In the following invention, a number of terms will be used which are herein defined. A wave guide holder as used in this application is any device which holds a wave guide such that relative position, distance, or pressure between the waveguide and a periodic grating can be adjusted. In one embodiment, the waveguide holder holds the waveguide in a fixed position while the position of the external grating is adjusted. In an alternative embodiment, the waveguide holder is adjusted to move the waveguide to different positions with respect to the external grating. Examples of wave guide holders includes, but is not limited to, a block, a substrate of a semiconductor wave guide, the insulation surrounding a wave guide, or other apparatus which can be used to grip or prevent unwanted movement of the wave guide relative to a periodic grating. Furthermore, although the term periodic will be used throughout this application, the term "periodic grating" will be defined to include chirped gratings in which the periodicity of the grating is not constant across the surface of the grating. Finally, the term "mode coupling" will be defined to include the coupling of light in the fiber between different transversal modes (such as $L_{01}$ and $L_{11}$ modes), between counter propagation modes such as the forward and backward propagating modes (e.g. light propagating in the forward and backward directions), between a core mode and a cladding mode (e.g., light confined in the fiber core or leaked into the cladding), and between polarization modes (e.g., in birefringent fibers where the light signal polarized along the slow axis is coupled to the fast axis). The term "adjustable grating" will be defined to include movable gratings as well as gratings which are fixed in position, but are coupled to a waveguide holder which may be repositioned to move a waveguide with respect to the fixed position of the grating.

In the following application, techniques for changing the distance or pressure between grating and waveguide will be described. The described techniques will include using screws, piezo-electrics, and springs. However, other devices may be used, such as magnets and electro-magnetic actuators. Likewise, the specification will describe implementing the invention with a fiber optic cable although other wave guides may be used. It is understood that the following detailed description will include these specifics to illustrate the preferred embodiments and also to enable one of ordinary skill in the art to implement the invention, however, these specifics should not be interpreted to limit the invention to only the embodiments described herein as other embodiments which would be obvious to one of ordinary skill in the art are also possible.

In one embodiment of the invention, an external periodic grating is positioned to effect an internal refractive index (or phase) grating that influences the light signal propagating inside the waveguide. In the illustrated example FIG. 2A, the wave guide is an optical fiber 204. However, it is to be understood that the wave guide does not have to be an optical fiber and may include semiconductor wave guides and other media for channeling light.

Figure 2:
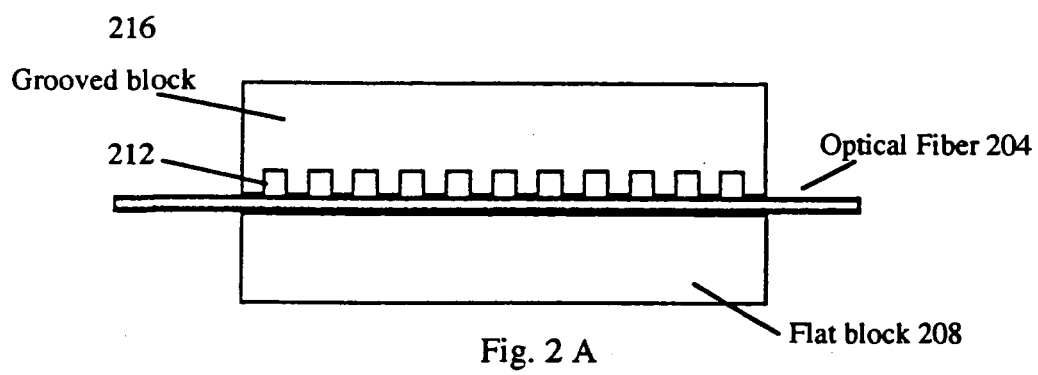
FIGS. 2A, 2B, illustrate two embodiments of the invention to cause mode coupling in a waveguide.
FIGS. 2C, 2D, 2E, 2F and 2G illustrate alternative groove patterns which may be used for the periodic grating.
Figure 2:
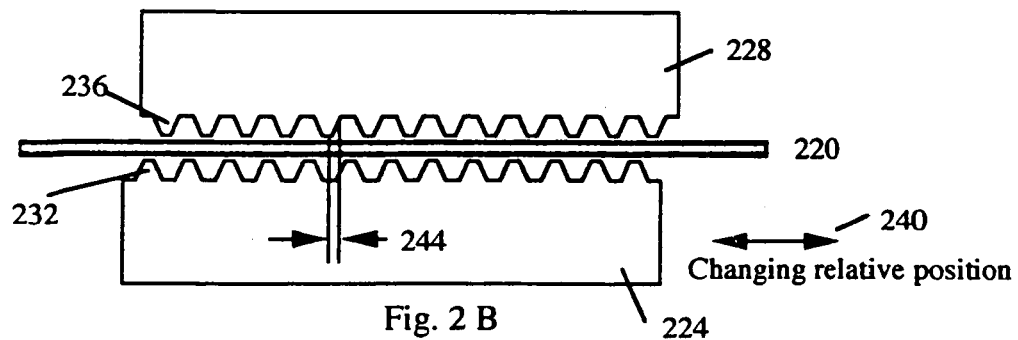

One method of using an external grating to create an internal index grating is to press the external grating against the waveguide, as shown in FIG. 2a. When the external grating 212 is pressed against the fiber (waveguide) 204, an index grating will be generated in the waveguide via the photoelastic effect. Such an effect has been successfully used by the inventor to induce birefringence in fibers and hence to control the polarization states of light. (U.S. Pat. No. 5,561,726 by X. Steve Yao hereby incorporated by reference).

In FIG. 2A, the optical fiber 204 is pressed between a holder, which in one embodiment includes a flat block 208 and a periodic grating 212. In the illustrated embodiment of FIG. 2A the periodic grating 212 is formed in a grooved block 216. Movement of the grooved block 216 against the optical fiber 204 which is held in position by the holder or flat block 208 causes a periodic refractive index change inside the fiber with a periodicity defined by the external grating. This periodic index change in turn causes mode coupling inside the optical fiber 204. Changing the pressure of the periodic grating 212 against the optical fiber 204 which is held in position by holder or flat block 208 causes certain wave lengths of light propagating in the optical fiber 204 in one propagating mode to couple to a different mode. The different mode includes, but not limits to a transversal mode, a cladding mode, a polarization mode, and a counter-propagation mode. The changing pressure allows "tuning" (adjusting of the light propagation characteristics) of the optical fiber 204. In particular, changing the pressure alters the coupling strength or the amount of coupling between the two modes.

In another embodiment of the invention, periodic grating 212 does not have to be in actual contact with optical fiber 204 to cause mode coupling. It is sufficient that periodic grating 212 is positioned within an evanescent field of the light propagating in optical fiber 204. The distance the evanescent field extends from the core of optical fiber 204 is typically fairly small, on the order of sub microns and microns. Therefore, the cladding of the fiber needs to be reduced or removed to allow positioning of grating 212 close to the core and provide a sufficiently strong influence on the light signal. Moving periodic grating 212 in and out of the evanescent field causes light in optical fiber 204 to couple from one mode to another, and hence change the spectrum, polarization, or signal strength of the light. Index matching fluids or gels may also be applied between the periodic grating 212 and optical fiber 204 to enhance the mode coupling. Evanescent fields and the effective distance of the evanescent field from the surface of a fiber are well understood in the art.

Depending on the position of periodic grating 212 relative to waveguide 204, three effects may be achieved. At a first position, the periodic grating is far enough away spatially from the optical fiber 204 that it does not cause a perturbation of the field of the signal propagating in the optical fiber. At a second position the periodic grating is within the evanescent field produced by the signal in the fiber. As a result, the light signal inside the fiber is influenced by the grating 212 and couples inside fiber from one mode to another. In a third position, the periodic grating 212 contacts optical fiber 204. The pressure of the periodic grating on optical fiber 204 also creates a periodic change in the index of refraction, n, of the fiber via the photoelastic effect. Thus the light signal inside the fiber is influenced by both the periodic grating 212 itself and by the pressure induced grating inside fiber, resulting in possibly stronger mode coupling, including Bragg reflection of light propagating in the optical fiber. Therefore, the amount of mode coupling can also be controlled by the position of the periodic grating 212.

As previously indicated, there are many types of mode coupling that can occur in an optical fiber. The periodicity, or the grating spacing of the fiber, and the optical wavelength of the propagating light determine the type of the mode coupling. For example, when $\lambda$ is the wavelength of light field in the fiber (or waveguide), $n_c$ is the effective index of refraction of the fiber core, $n_{c1}$ is the effective index of the cladding, $\Lambda$ is the grating spacing, then the condition for coupling between a forward and backward propagating modes, or Bragg reflection, is:

$$\Lambda=\lambda/2n_c \quad (1)$$

For coupling light from a fiber core to a fiber cladding, the grating spacing is determined by:

$$\Lambda=\lambda/(n_c-n_{c1}) \quad (2)$$

For mode coupling in a birefringent fiber between the fast mode (the polarization of light is along the fast axis of the fiber) and the slow mode (the polarization of light is along the slow axis of the fiber), the grating spacing is:

$$\Lambda=\lambda/(n_s-n_f) \quad (3)$$

where $n_s$ is the effective refractive index of the slow axis and $n_f$ is the index of the fast axis.

For mode coupling in a multimode fiber between two transversal modes, the grating spacing is:

$$\Lambda=\lambda/(n_1-n_2) \quad (4)$$

where $n_1$ is the effective refractive index of mode 1 and $n_2$ is the index of mode 2.

Conversely, when a grating period is given, the wavelength of the light signal that may influenced by the grating can be calculated using Eq. (1) to Eq. (4).

These principals of Bragg reflection and mode coupling are well understood in the art and are described in Yariv's Optical Waves & Crystal, pages 405 to 503.

Figure 3A:
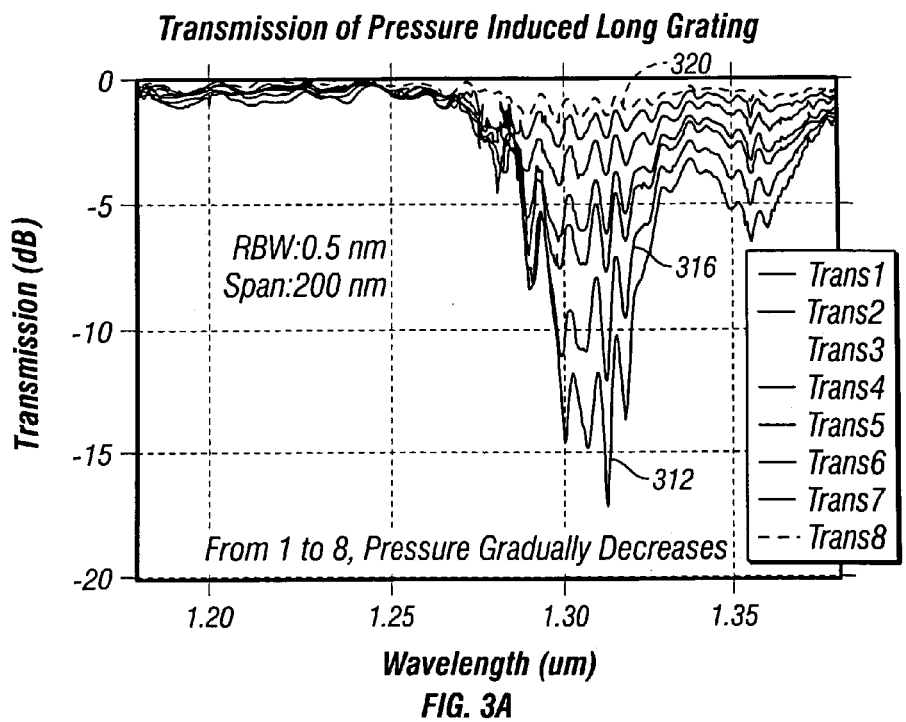
FIGS. 3A and 3B are a graphs which plot light intensity as a function of wavelength output by one embodiment of the present invention.
Figure 3B:
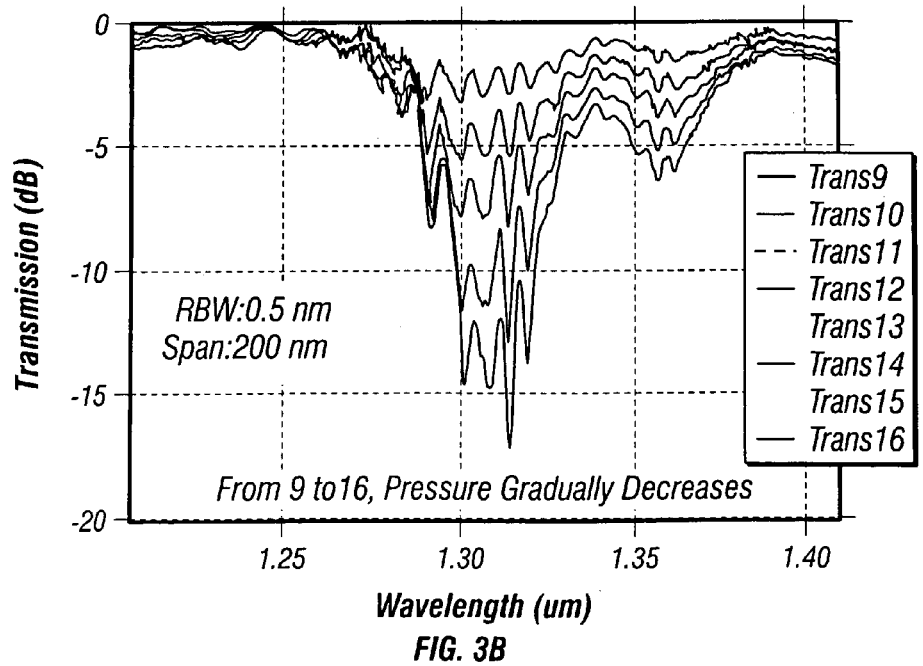

Because the amount of mode coupling can be controlled by controlling the pressure of the grating on the fiber or the position of the grating, tunable devices for controlling the light signal inside the fiber can be realized. FIG. 3 illustrates the result of a tunable wavelength selective variable attenuator based on the signal coupling between the core and cladding modes. Such a device is important in wavelength division multiple (WDM) access systems where the strength of the different wavelength channels need to be precisely controlled. In FIG. 3, the transmission characteristic of light through the waveguide at predetermined wavelengths is plotted. In the experiment, a 2 cm long external grating was pressed onto a standard communication fiber with a removed buffer. The grating was designed to coupled the light signal of around 1310 nm inside the core of the fiber into the fiber cladding. Once the signal coupled into the cladding, it will be strongly attenuated because the cladding has extremely high loss compared with the core. In one example, the index difference between the core and the cladding is $0.25 \times 10^{-2}$, a suitable grating spacing may be 524 um as determined using Eq. (2). Each curve 312, 316, 320 represents the output of the waveguide at a particular pressure of the periodic grating against the waveguide. At high pressure, curve 312 of FIG. 3 shows that a significant portion of the light is coupled out and attenuated. At intermediate pressure, substantially less light at a given frequency is attenuated, as illustrated by curve 316. At low pressure, curve 320 shows that very little light is attenuated. Thus by altering the pressure of periodic grating 212 against optical fiber 204, the amount of light reflected can be adjusted or "tuned." Therefore, a narrow bandwidth variable attenuator is created.

FIG. 2B illustrates an alternate embodiment of the invention which allows altering the periodicity of the grating. In FIG. 2B, the holder 224 which holds the optical fiber 220 such that the fiber does not move away from grooved block 228 is also grooved with a second set of periodic grating 232. Thus, both holder 224 and grooved block 228 contain corresponding periodic gratings 232 and 236. By moving the first periodic grating 232 with respect to a second periodic grating 236 in the direction shown by arrow 240, the effective periodicity of the periodic grating combination can be adjusted. When an offset distance 244 is zero, the first grating 232 and second grating 236 coincide or are aligned, the effective periodicity of the two gratings is equal to the periodicity of the first grating 232. However, when offset distance 244 is a maximum, where maximum is defined to be when offset distance 244 is equal to one-half of the periodicity of a grating, the effective periodicity seen by the optical wave propagating fiber 220 is twice the periodicity of first periodic grating 232.

Figure 2C:
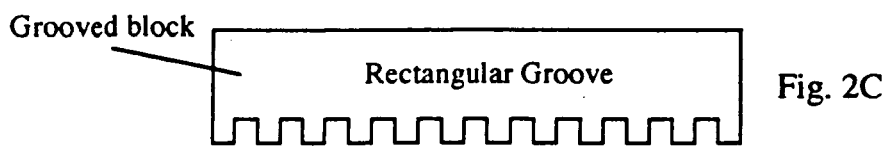
Figure 2D:
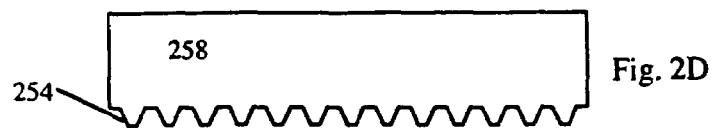
Figure 2E:
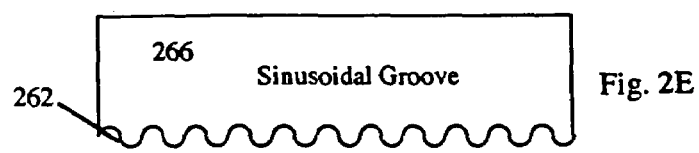
Figure 2F:
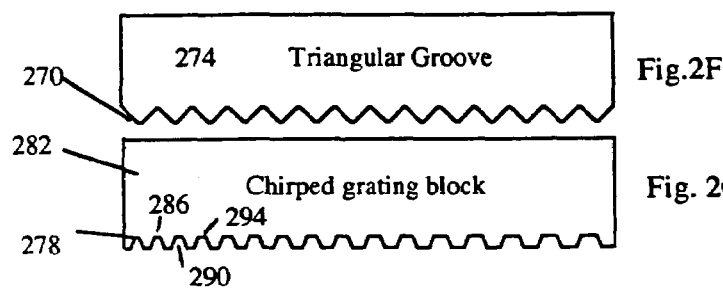

FIG. 2C, FIG. 2D, FIG. 2E and FIG. 2F illustrate different patterns which may be used for periodic grating 212, 236, to 236. In FIG. 2C a rectangular periodic grating is illustrated for use in the grooved block 216. FIG. 2D illustrates the use of a trapezoidal 254 periodic grating in a grooved block 258 as illustrates in FIG. 2D. FIG. 2E illustrates a sinusoidal periodic grating 262 in a grooved block 266. FIG. 2F illustrates a triangular periodic grating 270 in a grooved block 274. The grooved blocks illustrated in FIG. 2C, FIG. 2D, FIG. 2E, and FIG. 2F illustrate examples of groove patterns which may be used in the devices shown in FIG. 2A and FIG. 2B. The periodic gratings illustrated in FIGS. 2C through 2F are for example only, other periodic structures may be used as is understood by those of ordinary skill in the art.

Figure 2G:
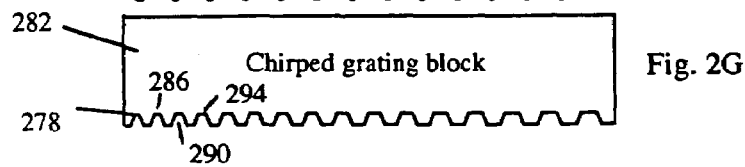

FIG. 2G illustrates a chirped periodic grating 278 in a grooved block 282. Although chirped grating 278 does not have uniformly spaced groove peaks, for purposes of this application, chirped grating 278 is defined to be one type of periodic gratings. Chirped grating 278 includes a series of grooves 286, 290, 294, the spacing of the grooves with respect to adjacent grooves can be defined by a mathematical function of a position along the grating block 282. In one embodiment of the chirped grating, the spacing of grooves 286, 290 and 294 increases linearly across chirped grating 278. In an alternate embodiment, spacing of grooves 286, 290, 294 increases in a quadratic function across chirped grating 278. By altering the grating spacing across chirped grating block 282, the spectrum of the light signal which undergoes mode coupling within the optical fiber 204 can be increased, thereby increasing the bandwidth of light affected by the grating. In the case of Bragg reflection, a chirped grating can also be used to compensate dispersion of the light signal (F. Ouellette, "All fiber filter for efficient dispersion compensation," Optics Letters, Vol. 16, No. 5, pp. 303–305) and hence increase the fibers transmission rate.

Figure 4A:
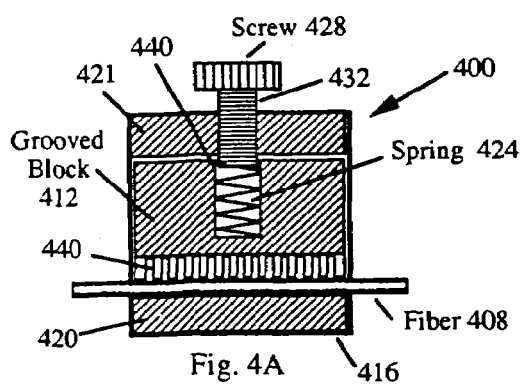
FIGS. 4A and 4B illustrate cross-sectional views of a tunable apparatus used in one embodiment of the present invention.
Figure 4B:
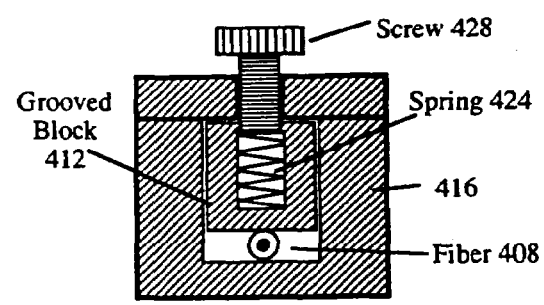

FIG. 4A and FIG. 4B show cross-sectional views of an apparatus 400 used to press a periodic grating 404 against an optical fiber 408. In FIG. 4A, grooves cut into a grooved block 412 form the periodic grating 404. A holder 416 which in the embodiment shown in FIG. 4A includes a flat surface 420 that supports an opposite side of the optical fiber 408. The holder 416 and the grooved block 412 containing the period grating 404 interact to clamp the fiber between the grooved block 412 and flat surface 420.

A spring 424 presses the grooved block 412 to keep a constant pressure on the optical fiber 408. Spring 424 typically has a spring constant K such that the force applied to the grooved blocks is equal to F=K·X where X is the distance by which the spring is compressed.

The pressure applied by the spring is adjusted by changing the compression of spring 424. In one embodiment, the pressure on spring 424 is controlled by a screw 428. Threads 432 on the screw interlock with threads 436 in the holder 420 such that rotation of screw 428 moves the screw in and out of holder 420. Rotation of screw 428 such that additional pressure is applied to spring 424 causes grooved block 412 to press harder against optical fiber 408 resulting in a greater change in the index of refraction of fiber 408 and more intense mode coupling of the predetermined wavelength of light. In one embodiment of the invention, when screw 424 is rotated outward, a tip 440 of the screw attaches to a portion of the grooved block 412 lifting the grooved block away from the optical fiber 408 to prevent mode coupling of light transmitted in optical fiber 408.

Figure 5A:
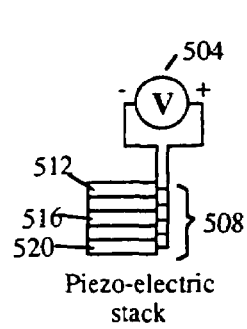
FIGS. 5A and 5B illustrate use of a piezo-electric to move the periodic grating in one embodiment of the present invention.
Figure 5B:
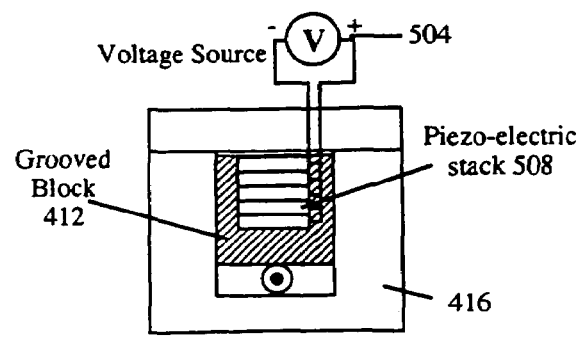

Other methods for moving the periodic grating towards and away from the optical fiber 408 may be implemented. For example, FIG. 5A and FIG. 5B illustrate using a piezo electric acurator to move the grooved block 412 towards and away from optical fiber 408. FIG. 5A illustrates a piezo electric stack 508. A power source such as voltage source 504 is connected to a stack 508 of piezo electric elements 512, 516, 520. Altering the voltage applied across the stack 508 changes the displacement of stack 508. When the piezo electric stack 508 is substituted for spring 424 of FIG. 4A, the grooved block 412 can be moved towards or away from the optical fiber 408 by adjusting voltage source 504.

Two methods of moving the grooved block have been illustrated in FIG. 4B and FIG. 5B. The first method uses a mechanical spring and screw arrangement structure while a second method uses a piezo electric device. Other methods of moving a grooved block are available to one of ordinary skill in the art. These methods may include but are not limited to lever arrangements, and other mechanical, electro-mechanical, magnetic, or electro-magnetic devices suitable for moving an object over small distances. In the remaining description, various embodiments of this invention will be described using primarily a spring and screw, although it is understood that piezo electric stacks may be substituted for the screw spring arrangements as well as other mechanical and electro-mechanical devices.

In one embodiment of the invention, the waveguide used is an optical fiber which includes an optical fiber core surrounded by a cladding. When a clad fiber is used, a portion of the cladding may be reduced as illustrated in FIGS. 6A and 6B to improve the effectiveness of the periodic grating. FIG. 6A illustrates a side polished fiber where a portion of the cladding 604 has been polished away to create a flat surface 608. A periodic grating positioned against the side polished flat surface 608 is in close proximity to the fiber core 612 such that a light signal propagating down the fiber core 612 is strongly influenced by the grating and undergoes mode coupling.

FIG. 6B illustrates one method of side polishing a clad optical fiber. In FIG. 6B, fiber 408 is placed in a substrate 616 which holds the fiber steady. The fiber 408 is then polished to create a flat surface 608 approximately level with a top surface 620 of the substrate 616. In one embodiment of the invention, the substrate 616 can subsequently be used as the fiber holder to hold the fiber steady while the periodic grating is applied to flat surface 608 of fiber 408.

The preceding description describes a basic tunable apparatus in which the periodic grating is moved in a direction perpendicular to the direction of light propagating down a waveguide such as an optic cable. By adjusting the orientation or periodicity of a grating in the tunable apparatus or by repositioning the tunable apparatus, various devices can be made.

In one embodiment of the invention, the periodic grating is rotatable. Rotating the periodicity of the grating changes the effective periodicity of the gratings as illustrated in FIG. 7A. In FIG. 7A periodic grating 704 is rotated with respect to the direction of light propagation in waveguide 708 by an angle θ. Screw mechanism 712 is used to apply pressure to one end of the periodic grating which rotates periodic grating 716. It is recognized that a piezo electric or other device can be substituted for screw 712. The effective grating spacing of the rotated grating is equal to the spacing of the grating divided by the cosine of the angle θ:

$$\Lambda' = \Lambda / \cos \theta \tag{5}$$

Changes in an effective grating also changes the wavelength of the light signal that undergoes mode coupling according to equations (1) to (4). When the grating spacing is selected such that light inside a fiber core either undergoes the Bragg reflection as defined in Eq. (1) or is coupled out into fiber cladding as defined by equation (2) and illustrated in FIG. 3, a wavelength tunable variable attenuator (WTVA) is created. By adjusting both the angle θ and the position (or pressure) of the grating against the fiber, one is able to selectively attenuate a signal of any wavelength by a variable amount. Such a wavelength tunable variable attenuator is extremely useful for wavelength division multiple (WDM) access systems to equalize optical powers in different channels.

Figure 8A:
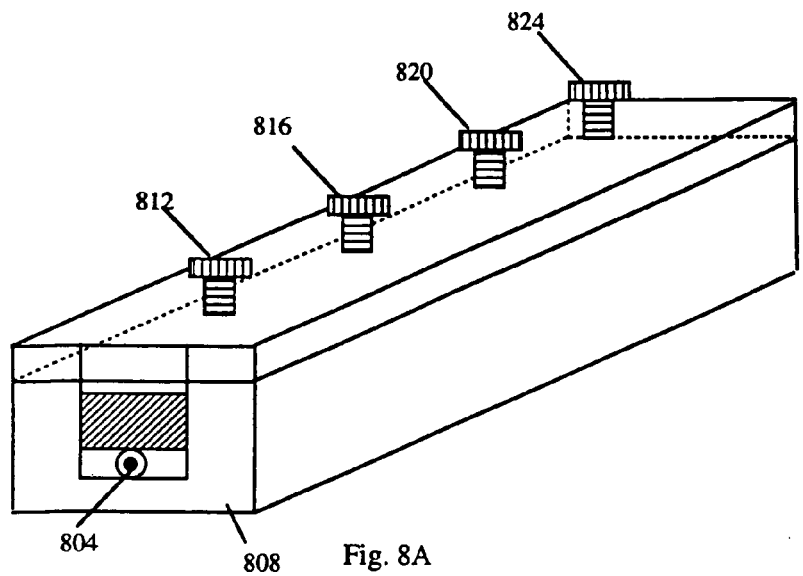
FIGS. 8A, 8B and 8C illustrate alternative embodiments of implementing an optical equalizer implemented using a plurality of adjustable periodic gratings.
Figure 8B:
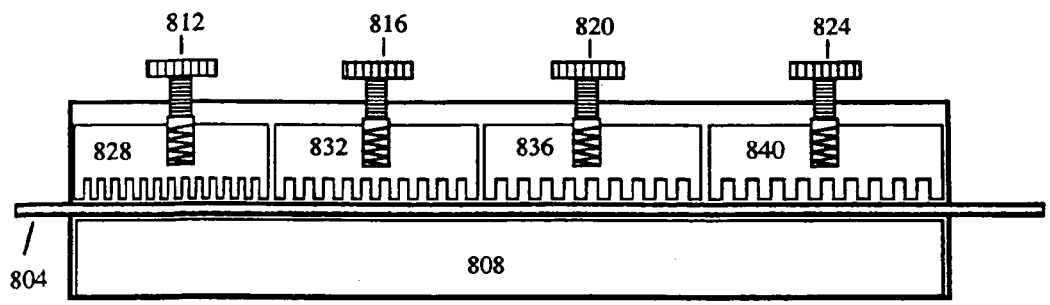
Figure 8C:
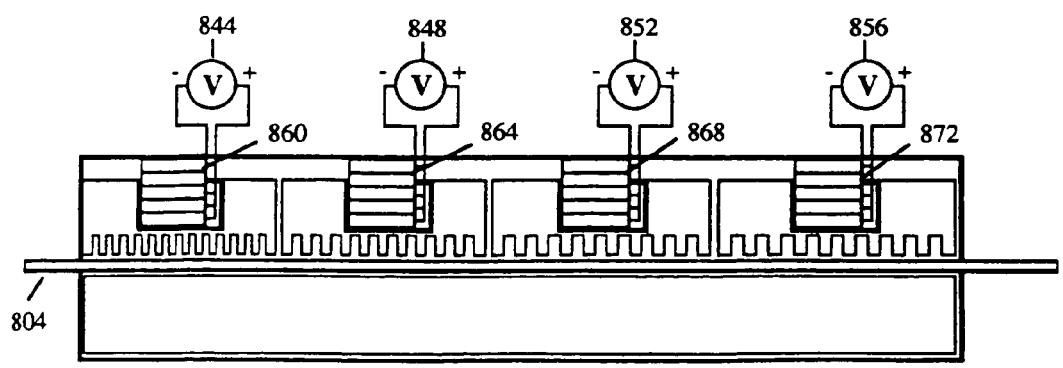

Several such wavelength tunable variable attenuators cascaded together can operate as an optical spectrum equalizer. FIGS. 8A, 8B and 8C illustrate various embodiments of such an optical equalizer using a plurality of tunable gratings. In FIG. 8A, a fiber holder 808 or casing holds a waveguide 804 steady. A plurality of moving devices such as screws 812, 816, 820, 824 moves a corresponding grooved block. A cross-section of one embodiment of an optical equalizer is illustrated in FIG. 8B. Each screw and spring arrangement corresponds to a corresponding grooved block. For example, screw 812 corresponds to grooved block 828, screw 816 corresponds to grooved block 832, screw 820 corresponds to grooved block 836, and screw 824 corresponds to grooved block 840. Each grooved block has a grating with a different periodicity. A user selects what frequencies or wavelengths of light to filter and then selects a grooved block with a periodicity which will induce mode coupling (including core/cladding coupling and Bragg reflection) at the selected wavelength. The user then adjusts the selected grooved block to press against waveguide 804 and induce mode coupling at the desired wavelengths. By selecting and positioning periodic gratings with predetermined periods against fiber 804, a user selects which wavelengths of light to couple out and thus filter.

FIG. 8C illustrates the optic equalizer illustrated in FIG. 8B where the screws 812, 816, 820, 824 and corresponding springs have been replaced with a plurality of voltage sources 844, 848, 852, 856 and corresponding piezo electric stacks 860, 864, 868, 872 of piezo electric elements. By adjusting the voltage of the voltage sources and thereby changing the dimensions of the corresponding piezo electric stack, each periodic grating with its corresponding periodicity can be moved away from or towards fiber 804 to induce mode coupling of light at the desired frequencies.

FIG. 9 is a graph illustrating an example output of an optical equalizer for flattening the output spectrum of a WDM system. FIG. 9 plots the intensity of light on a Y-axis 904 with respect to the wavelength of light which is plotted on X-axis 908. In the example, the "output" of the optical equalizer is defined to be the light which undergoes Bragg reflection or other types of mode coupling. In the example, three peaks 912, 916, 920 are the spectral "bumps" of the original signal input to the equalizer. At the output, each peak is removed by a corresponding grating with a properly adjusted angle θ and pressure (or position) via a proper type of mode coupling. The removal of the highest peak 912 requires more mode coupling, corresponding to higher pressure of a grating against a fiber in core/cladding coupling (or closer positioning of a grating against a fiber in the case of Bragg reflection). Removal of lower peaks requires a weaker mode coupling and therefore less pressure.

FIG. 10 illustrates using a plurality of tunable apparatuses, each apparatus including adjustable periodic gratings to create a variable delay line via grating induced Bragg reflection. In the variable delay line of FIG. 10, an input 1008 of a circulator 1004 receives an incoming signal. Light entering input 1008 exits the circulator 1004 at an input-output port 1012 into a delay unit 1016. Delay unit 1016 includes a plurality of periodic gratings 1018, 1020, 1022, 1024. In one embodiment of the invention, each periodic grating 1018, 1020, 1022, 1024 has the same periodicity. A switch such as switches 1026, 1028, 1030, 1034 couples a voltage source 1140 to the corresponding periodic grating 1018, 1020, 1022, 1024. Closing a switch, such as switch 1026, moves a corresponding periodic grating 1018 towards a section of the waveguide in delay unit 1016.

By selecting one grating in the plurality of gratings 1018, 1020, 1022, 1024 to move against the section of waveguide 1044, a variable delay is created. Moving a periodic grating positioned far away from circulator 1012 against the section of waveguide 1044 results in a long delay because light must travel from the circulator to the grating and then return to the circulator 1012 before being output. Moving a periodic grating such as grating 1018 positioned close to the circulator 1012, against the section of waveguide results in shorter delays because the light has to travel only a short distance before being reflected back to the circulator. The delayed signal re-enters circulator 1004 through input-output port 1012 and exits the circulator from output port 1052. In typical use of the invention, only one switch in the plurality of switches is closed creating one reflected signal with a predetermined delayed time.

When the range of delays is not large, a simple delay circuit as illustrated in FIGS. 11A and 11B may be used. In the illustrated embodiment, a circulator such as circulator 1104 may be used. An input port 1108 of circulator 1104 receives an input signal. A delay unit 1116 processes the signal between the time the signal is input and output by the circulator 1130. Delay unit 1116 includes a periodic grating which is adjustable in a lateral direction 1120. A screw 1124 moves the periodic grating 1122 in lateral direction 1120 to create variable delays in the delay line segment 1112. Moving the periodic grating 1122 in a lateral direction 1120 closer to the circulator results in shorter delays while moving the grating 1122 in a lateral direction 1120 away from circulator 1104 results in longer delays. The delayed signal along delay unit 1112 returns to circulator 1104 through input-output port 1108 and is output through output port 1130.

FIG. 12A illustrates using an adapter 1204 to connect two polarization maintaining (PM) fibers 1208 and 1218. The apparatus of FIG. 12A uses the relationship defined by equation (3) to rotate the polarization in polarization maintaining (PM) fibers. As described in U.S. Pat. No. 5,561,726 entitled "Apparatus and method for connecting polarization sensitive devices", traditional methods of interconnecting two PM fibers involves precision alignment of the fiber axes. However, using the device shown in FIG. 12A, one can simplify the cumbersome fiber axis alignment procedure. In the example illustrated in FIG. 12B, a polarization state 1248 of light propagating in PM fiber 1208 at the connector ferrule 1210 is aligned with a slow axis 1240 of PM fiber 1208. However, as illustrated in FIG. 12C, slow axis 1244 of receiving fiber 1218 is not aligned with slow axis 1240 at an input to a second connector ferrule 1212.

For light in receiving fiber 1218 to polarize along the slow (or fast) axis, polarization mode converter 1216 presses an external grating with a grating spacing 1238 defined by Eq. (3) against fiber 1218 to cause coupling between the two polarization modes. Rotating screw 1288 adjusts the pressure of the external grating against fiber 1218 until a substantial portion of the power polarized along the fast axis is coupled into the slow axis, or vise versa. Consequently, polarization mode converter 1216 aligns polarization state 1250 with slow axis 1244 of receiving PM fiber 1218. In alternate embodiments of the invention, a mechanical splice or a fusion splice may be substituted for fiber connectors 1268 and 1278.

Because polarization mode coupling is wavelength dependent, signals of a selected wavelength may be coupled into one polarization while signals of a second wavelength remain in an original polarization state. FIG. 13A illustrates using polarization mode coupling to fabricate a wavelength division multiplexer (WDM). In FIG. 13A, a first signal with wavelength $\lambda_1$ and a second signal with wavelength $\lambda_2$ propagate in PM fiber 1388. Both signals have polarization states 1300 and 1302 oriented along the slow axis of PM fiber 1388. When a grating 1328 with a spacing 1338 defined by $$\Lambda_1 = \lambda_1/(n_s - n_f) \tag{6}$$

is applied against PM fiber 1388 with sufficient pressure, the first signal with wavelength $\lambda_1$ is coupled into a fast axis while the second signal with wavelength $\lambda_2$ remains oriented along the slow axis. By combining the wavelength selective polarization mode converter 1216 with a polarization beamsplitter (PBS) 1310, a wavelength division demultiplexer is created to separate the signals of two wavelengths.

FIG. 13B illustrates using polarization mode coupling to fabricate an add/drop filter. In FIG. 13B, the signal with wavelength $\lambda_1$ is output from port 1318 of PBS 1310, while the signal with a wavelength $\lambda_2$ continues through port 1316 of PBS 1310. In addition, a third signal with a wavelength $\lambda'_1$ entering port 1320 of PBS 1310 is added to $\lambda_2$. One aspect of the devices illustrated in FIG. 13A and FIG. 13B is that the WDM and add/drop filter is switchable, a feature that is extremely useful in WDM networks.

Gratings with selected grating spacing corresponding to a set of selected wavelengths may be used to reorient the polarization of the selected wavelengths from a first polarization mode to a second polarization mode. Combining a set of polarization mode converters with a polarization beamsplitter allows separation of the selected wavelength channels from unselected channels. Such wavelength selective polarization mode conversion can be used to double the channel spacing of a WDM system. Wavelength selective polarization mode conversion may also be used in a fiber gyro system.

Core/cladding mode coupling in a PM fiber can also be used to fabricate a polarizer. Because the indices of refraction are different for a mode polarized along the slow axis and a second mode polarized along the fast axis, core/cladding coupling may occur for one polarization mode and not a second mode. For example, when a grating spacing is chosen such that $$\Lambda = \lambda/(n_{cs} - n_{c1}), \tag{7}$$

where $n_{cs}$ is the effective index of the guided mode polarized along the slow axis, $n_{c1}$ is the effective index of the cladding, and $\lambda$ is the wavelength of the propagating light, the mode polarized along the slow axis will be coupled into the fiber cladding and be attenuated. The signal polarized along the fast axis will remain in the core and unaffected. Therefore, a polarizer is created without the light exiting the fiber. By adjusting pressure of the grating against the fiber, the extinction ratio of the polarizer can be controlled to produce a polarization dependent variable attenuator.

Figure 14A:
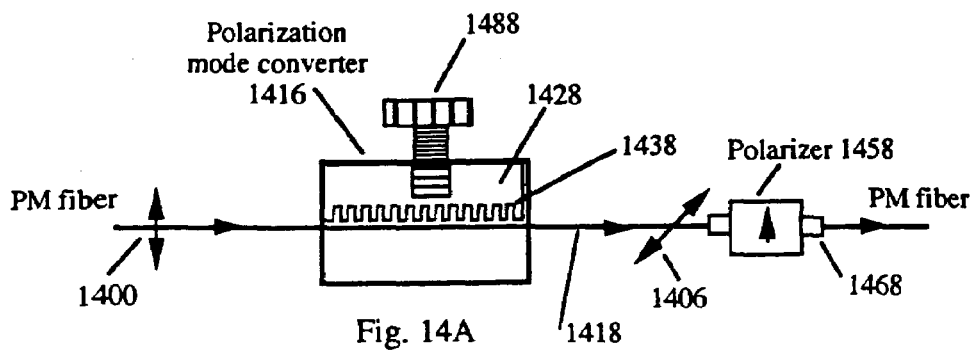
FIG. 14A illustrates using a grating induced polarization mode converter with a fiber polarizer to form a variable attenuator.
Figure 14B:
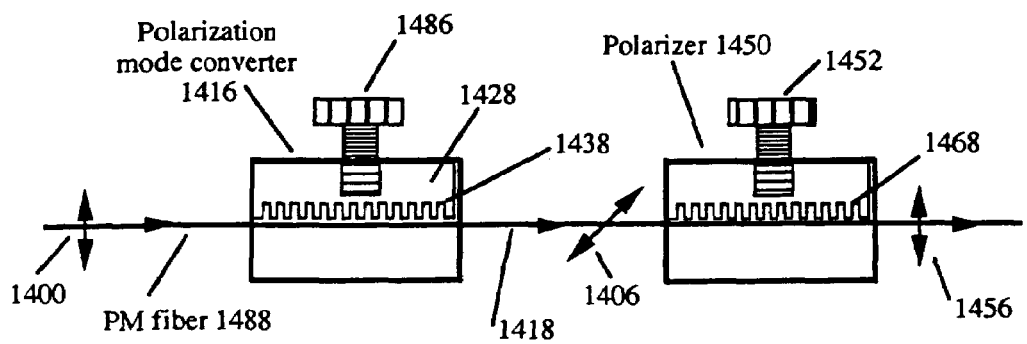
FIG. 14B illustrates making a variable attenuator with a grating induced fiber polarizer and a grating induced polarization mode converter.
Figure 14C:
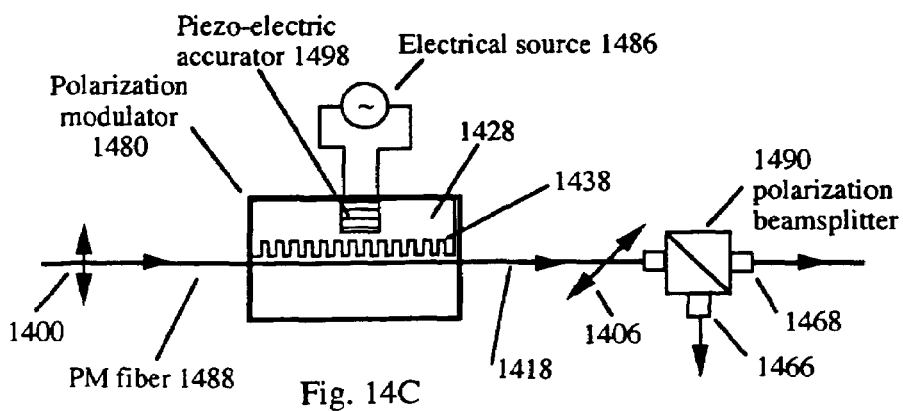
FIG. 14C illustrates making a modulator with a grating induced polarization mode converter and a polarization beamsplitter.

A fiber switch or a variable attenuator may be formed by combining a grating induced polarization mode converter with a fiber polarizer. FIG. 14A illustrates a polarization mode converter 1416 connected to a fiber polarizer 1458. Adjusting the pressure of a grating against a section of fiber rotates the polarization of a signal propagating in the fiber. In the illustrated embodiment, polarizer 1458 allows only one polarization to pass, thereby reducing the power of the signal propagating in the fiber. A fiber optic modulator/switch can be realized by replacing adjustment screw 1488 with a piezo-electric actuator 1498 controlled by an electrical source 1486, as illustrated in FIG. 14C. FIG. 14B illustrates one embodiment of the invention in which polarizer 1458 of FIG. 14A has been replaced with an all fiber polarizer 1450. All fiber polarizer 1450 includes a grating with a spacing 1468 defined by Eq. (7) coupled to a section of fiber 1488. In FIG. 14C, a polarization beamsplitter 1490 replaces polarizers 1458 and 1450 in FIGS. 14A and 14B to make a variable polarization separator or a fiber optic modulator/switch with two complimentary output ports.

A transversal mode converter conforming to the relationship described in Eq. (4) is especially useful in an optical fiber which supports two transversal modes (bimodal fiber). In practice, any single mode fiber can be used as a bimodal fiber when the wavelength of a light signal in the fiber is below the cutoff wavelength of the fiber. In the following description, several devices which can be made using the wavelength tunability and coupling strength tunability of the invention described in FIGS. 4, 5 and 7 will be described.

Figure 15A:
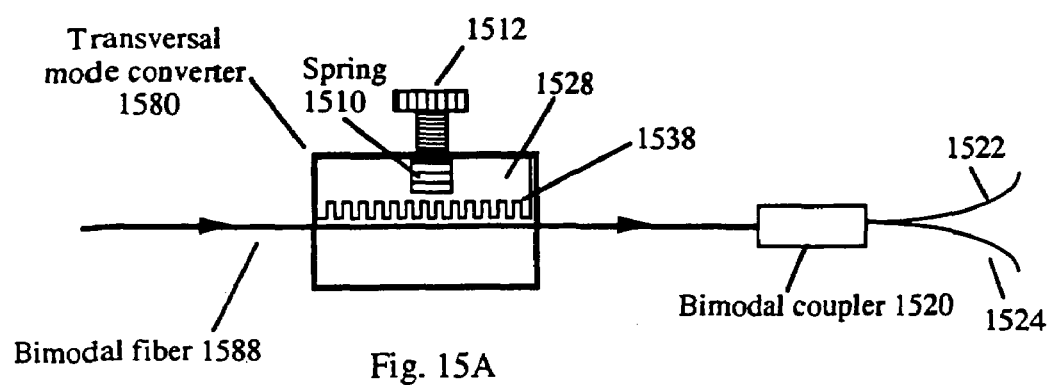
FIG. 15A and FIG. 15B illustrate a variable attenuator and a modulator made from a grating induced transversal mode converter and a bimodal coupler.
Figure 15B:
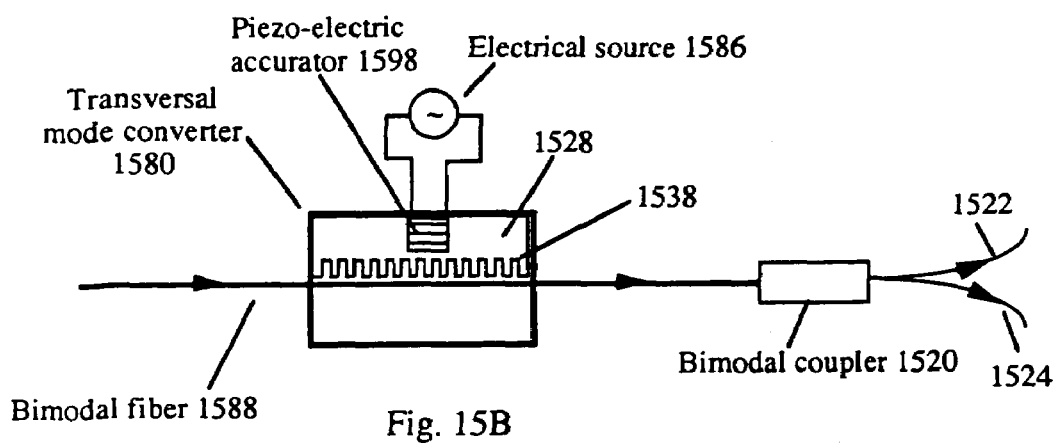

FIG. 15A and FIG. 15B illustrate a fiber optic modulator, a switch, and a variable attenuator formed by coupling the output of the transversal mode converter 1580 with a bimodal coupler 1520.

Figure 16A:
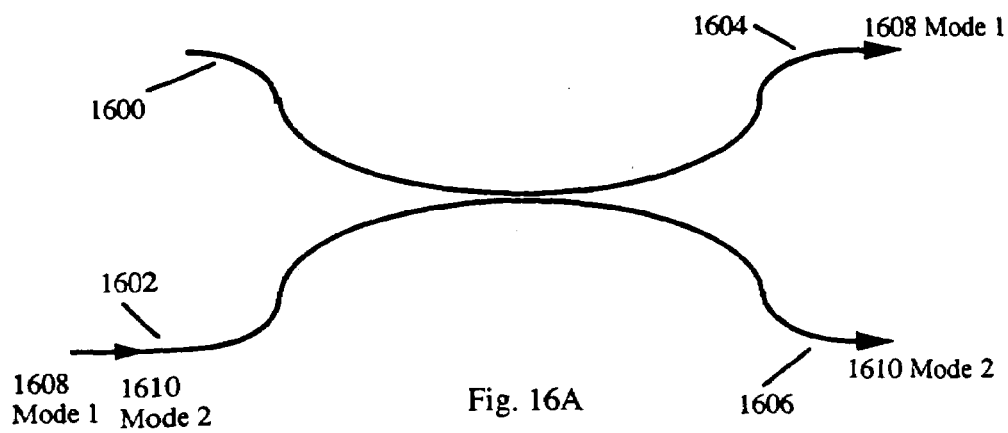
FIG. 16A and FIG. 16B illustrate the operation of a bimodal coupler.
Figure 16B:
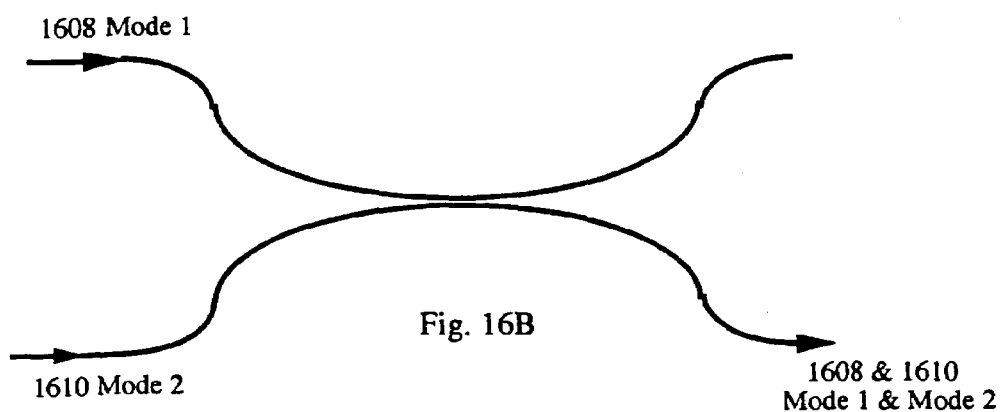

FIG. 16A illustrates a bimodal coupler which separates two modes 1608 and 1610 in a bimodal fiber 1602 into different fibers 1604 and 1606. The bimodal coupler can also be used to transfer two signals 1612 and 1614 from two different fibers 1616 and 1618 into two different transversal modes in a bimodal fiber 1620, as shown in FIG. 16B. A biconic fused coupler technique or side polished coupler technique commonly used in manufacturing fiber optic couplers and WDMs as understood by those of skill in the art can be used to make a bimodal fiber coupler. Positioning two bimodal fibers or one bimodal and one single mode fiber together in close proximity, as shown in FIG. 16A, induces mode coupling between the two fibers. Different propagation constants of the two modes results in different coupling strengths of each mode. For a properly selected coupling strength (determined by the distance between the two fibers, the propagation constant of the mode, and coupling length), one mode will be completely (or near completely) coupled into the other fiber and the remaining mode will remain in the original fiber.

FIG. 15A illustrates adjusting a pressure on grating 1528 with a groove spacing defined by Eq. (4) against bimodal fiber 1588 to control mode coupling. Changing the amount of mode coupling changes the output from port 1522 and/or port 1524 of bimodal coupler 1520, resulting in variable attenuation of the output signal. FIG. 15B illustrates using an electrical actuator 1598 to control the mode converter 1580 such that the variable attenuator operates as a switch or a modulator.

Figure 17:
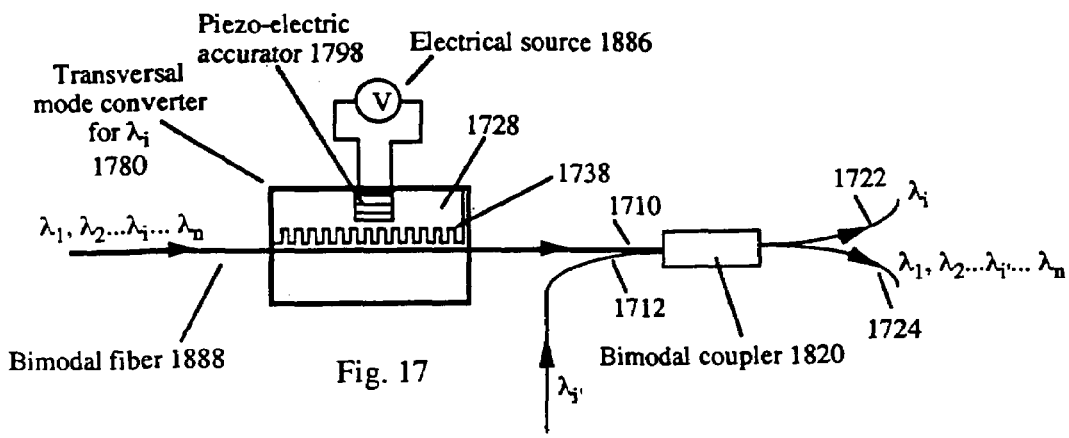
FIG. 17 shows an add/drop filter made from a grating induced transversal mode converter and a bimodal coupler.

Because the transverse mode converter is highly wavelength selective, the devices illustrated in FIGS. 15A and 15B can also be used as a wavelength division multiplexer/demultiplexer or add/drop filter. As shown in FIG. 17, multiple signals of different wavelengths propagating in a first mode of bimodal fiber 1788 exit bimodal coupler 1720 from a first port 1724. Activating transversal mode converter 1780 for wavelength $\lambda_i$ converts wavelength $\lambda_i$ signals in a first mode to a second mode. Signals in the second mode exit coupler 1720 from a second output port 1722. In one embodiment of the invention, signals in second output port 1722 are removed (or dropped) from the system. To add a signal with a wavelength $\lambda'_i$, the added signal is input into second input port 1712 of bimodal coupler 1720. A second mode converter may be used to ensure that the added signal is in the second mode. The bimodal coupler 1720 combines the added signal with other propagating signals in port 1724 which may be connected to a system bus (not shown).

Figure 18:
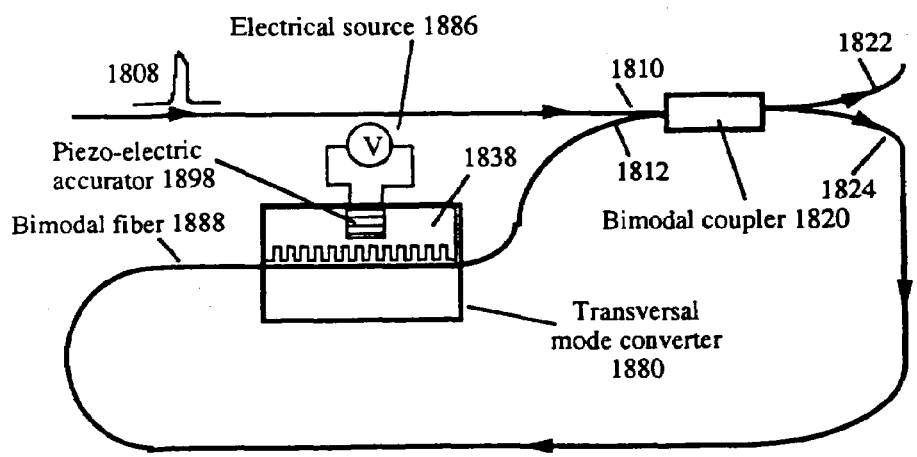
FIG. 18 illustrates an optical recirculating delay line including a grating induced transversal mode converter and a bimodal coupler.

FIG. 18 illustrates using the mode converter 1880 and bimodal coupler 1820 combination as a recirculating optical delay line. An input optical pulse 1808 in a first mode, "mode 1", is coupled into a bimodal fiber loop 1888 via bimodal coupler 1820. The pulse remains in mode 1 and exits loop 1888 from port 1822 of coupler 1820 after propagating around the loop once when mode converter 1880 is in an off state. However, when mode converter 1880 is activated to convert the pulse from mode 1 into a second mode, mode 2, the pulse does not exit the loop and instead propagates around the loop until the mode converter is activated again to convert the pulse back to the first mode whereupon the optical pulse exits the loop from port 1822 of coupler 1820. By controlling the mode converter as illustrated, an optical pulse may be delayed for a controlled period of time. Such recirculating optical delay lines are useful as a memory buffer in optical networks and in optical computers.

A similar recirculating optical delay line can also be made by replacing transversal mode converter 1880 of FIG. 18 with a polarization mode converter and replacing the bimodal coupler with a polarization beamsplitter.

While the Applicant has described various embodiments of the tunable apparatus which involves moving a periodic grating towards and away from a waveguide to induce mode coupling at certain predetermined wavelengths and various devices which can be built from such a tunable apparatus including a variable delay line, an optical equalizer, a wavelength division multiplexer, an add/drop filter, a polarization converter, and a wavelength selective variable attenuator, other embodiments and uses may be apparent to one of ordinary skill in the art. Thus, the invention should not be limited to merely the embodiments described in the preceding specification. The limitations of the application are specifically claimed in the Claims which follow.

What is claimed is:

1. A variable delay apparatus comprising:
   a waveguide segment;
   an adjustable periodic grating moveable along the waveguide segment in the direction of light propagation in the waveguide, the adjustable periodic grating inducing Bragg reflection in the waveguide;
   a circulator to transmit light to the waveguide segment and to receive light reflected within the waveguide segment and to redirect the reflected light from the adjustable periodic grating as an optical output which has a variable delay that varies with a position of the adjustable period grating along the waveguide segment; and
   a mechanism to adjust the adjustable periodic grating along the waveguide segment to change a distance between the circulator and the adjustable period grating to vary the delay in the optical output produced by the circulator.

2. The variable delay apparatus of claim 1 wherein the adjustable periodic grating is moved by a screw.

3. A device, comprising:
   a polarization maintaining fiber to guide light in first and second orthogonal polarizations;
   a grating having a periodic structure in contact with the polarization maintaining fiber to effectuate an optical grating in the polarization maintaining fiber, wherein the optical grating has a predetermined grating period that couples light at a selected wavelength in the first polarization into the second polarization and allows transmission of light at other wavelengths without changing polarization;
   a mechanism to press the grating against the polarization maintaining fiber and to change a strength of the effectuated optical grating in the polarization maintaining fiber; and
   a polarization beam splitter having an input port directly connected to the polarization maintaining fiber to receive light from the fiber that transmits through a region in the polarization maintaining fiber in contact with the grating, wherein the polarization beam splitter has an add port that receives a polarized optical input, a drop port to output light from the polarization maintaining fiber that is in the second polarization, and an output port to output light from the polarization maintaining fiber in the first polarization and the polarized optical input from the add port.

4. A device, comprising:
   a fiber to guide light in either one of a first fiber mode and a second fiber mode;
   a grating having a period structure in contact with the fiber to effectuate an optical grating in the fiber, wherein the optical grating couples light between the first and the second fiber modes;
   a mechanism to press the grating against the fiber and to change a strength of the effectuated optical grating in the fiber;

a first fiber to guide light;
a second fiber to guide light; and
a fiber coupler that couples the fiber to the first fiber and the second fiber so that light in the first fiber mode from the fiber is coupled into the first fiber and light in the second fiber mode in the fiber is coupled into the second fiber,
wherein the second fiber and the fiber are connected to form a loop.

5. A device as in claim 4, further comprising an add fiber coupled with the fiber coupler to add an add optical input to either the first or the second fiber.

* * * * *